United States Patent [19]
Van Laeken

[11] Patent Number: 6,153,035
[45] Date of Patent: Nov. 28, 2000

[54] METHOD AND APPARATUS FOR SECURING A THERMOPLASTIC INSERT WITHIN A SANDWICH PANEL

[75] Inventor: Howard J. Van Laeken, Seattle, Wash.

[73] Assignee: The Boeing Company, Seattle, Wash.

[21] Appl. No.: 09/249,028

[22] Filed: Feb. 12, 1999

[51] Int. Cl.⁷ .................................................. B29C 65/06
[52] U.S. Cl. ..................... 156/73.5; 156/309.6; 156/580; 264/68
[58] Field of Search ................................. 156/73.5, 285, 156/308.2, 309.6, 499, 580; 264/68

[56] References Cited

U.S. PATENT DOCUMENTS

| | | | |
|---|---|---|---|
| 3,510,916 | 5/1970 | Phelan | 18/36 |
| 3,528,466 | 9/1970 | Tracy | 144/32 |
| 3,722,671 | 3/1973 | Wright et al. | 206/65 K |
| 4,093,491 | 6/1978 | Whelpton et al. | 156/309 |
| 4,415,083 | 11/1983 | Kemkers | 206/334 |
| 4,427,471 | 1/1984 | Chierici | 156/73.5 |
| 4,477,307 | 10/1984 | Cearlock et al. | 156/580 |
| 4,551,189 | 11/1985 | Peterson | 156/73.5 |
| 4,566,924 | 1/1986 | Hara et al. | 156/73.5 |
| 4,758,392 | 7/1988 | Collins et al. | 264/68 |
| 4,761,871 | 8/1988 | O'Connor et al. | 29/432.1 |
| 4,780,035 | 10/1988 | Shibayama et al. | 411/171 |
| 4,784,591 | 11/1988 | Ackerman | 425/116 |
| 4,817,264 | 4/1989 | Worthing | 29/512 |
| 4,824,304 | 4/1989 | Shibayama et al. | 411/171 |
| 4,832,549 | 5/1989 | Shibayama et al. | 411/171 |
| 4,846,612 | 7/1989 | Worthing | 411/82 |
| 4,865,792 | 9/1989 | Moyer | 264/249 |
| 5,087,320 | 2/1992 | Neuwirth | 156/580.2 |
| 5,096,532 | 3/1992 | Neuwirth et al. | 156/580.1 |
| 5,110,403 | 5/1992 | Ehlert | 156/580.1 |
| 5,143,216 | 9/1992 | Aurtoi et al. | 206/338 |
| 5,147,482 | 9/1992 | Miyabayashi | 156/73.1 |
| 5,437,750 | 8/1995 | Rinse et al. | 156/73.1 |
| 5,536,344 | 7/1996 | van Dreumel | 156/73.5 |
| 5,593,120 | 1/1997 | Hamerski | 248/205.3 |
| 5,725,704 | 3/1998 | Gallagher et al. | 156/66 |
| 6,001,202 | 12/1999 | Penttila et al. | 156/73.5 |

*Primary Examiner*—James Sells
*Attorney, Agent, or Firm*—Brooks & Kushman P.C.

[57] ABSTRACT

A method is provided for securing a thermoplastic insert between first and second skin sheets of a sandwich panel using an installation tool to rotate the insert about a central axis. One of the installation tool and insert are provided with a male connection feature and the other is provided with a female connection feature such that the installation tool and insert are axially movable toward and away from each other to engage the male and female connection features without requiring relative rotation. The male and female connection features include mating surfaces offset from the central axis to transmit torque between the installation tool and insert. The insert is magnetically attracted to the installation tool by providing one of the installation tool and insert with a magnet and the other with a magnetic material to be attracted by the magnet. The installation tool and insert are then rotated while force is applied in order to drive the insert into the sandwich panel and to frictionally generate heat to friction weld the insert to the sandwich panel.

17 Claims, 6 Drawing Sheets

_Fig. 10_

_Fig. 12_

Fig. 11

METHOD AND APPARATUS FOR SECURING A THERMOPLASTIC INSERT WITHIN A SANDWICH PANEL

TECHNICAL FIELD

The present invention relates to a method and apparatus for securing a thermoplastic insert between first and second skin sheets of a sandwich panel using an installation tool.

BACKGROUND ART

Lightweight structural panels are commonly formed of a sandwich of two flat resin facings and an intermediate core structure which are bonded together for use as flooring, bulk heads, and the like in commercial aircraft. Sandwich panels possess a desirous characteristic of being lightweight, while still providing relative high strength and stiffness needed for structural support in the aircraft.

Various forms of fasteners have been developed to be secured in a hole that has been cut into the aircraft panel, such as the sandwich panel fastener of U.S. Pat. Nos. 3,510,916, 4,846,612 and 5,536,344. Sandwich panels can utilize an exterior sheet or skin such as a glass fiber reinforced polyetherimide, which is then adhered by an adhesive to a core structure. The core structure can be a plurality of strips of metal foil or other thin lightweight structural material, which have been bent to form a plurality of honeycomb cells. The opposite side of the core structure is adhered to a similar resin sheet to form a sandwich configuration.

The fastener insert can be installed in a lightweight sandwich panel by first drilling a hole of the desired size for the particular insert. The insert is then inserted within the hole and is usually secured by a potting compound that will harden to anchor the insert. Various different methods have been used in an attempt to position the insert into the hole and to hold it in the proper position while permitting the potting compound to be introduced into the core structure and to set and hold the fastener in its properly aligned position.

It is desirable to provide an improved method of installing a fastener member into a sandwich panel in a manner in which manufacturing efficiency is improved while manufacturing costs are reduced.

DISCLOSURE OF INVENTION

The present invention provides an improvement over prior art fastener insert methods by providing a method and apparatus whereby the thermoplastic insert is magnetically secured (or vacuum-attached) to an installation tool, and male and female connection features are provided on the installation tool and insert in order to transmit torque from the installation tool to the insert in order to use the insert to drill its own hole into the sandwich panel and to generate frictional heat to friction weld the insert within the sandwich panel. In this manner, inserts may be quickly and easily placed at the end of the installation tool, and the tool may readily drive the insert into position within the sandwich panel without significant handling limitations. Preferably, the male and female connection features are not threaded to eliminate alignment problems, and to allow quick attachment of the insert to the installation tool. The insert is also provided with a circumferential groove formed therearound to facilitate "pick-and-place" handling.

More specifically, the present invention provides a method of securing a thermoplastic insert between first and second skin sheets of a sandwich panel using an installation tool to rotate the insert about a central axis. The method includes providing one of the installation tool and insert with a male connection feature and the other with a female connection feature such that the installation tool and insert are axially movable toward and away from each other to engage the male and female connection features without requiring relative rotation. The male and female connection features include mating surfaces offset from the central axis to transmit torque between the installation tool and insert. The insert is magnetically attracted (or vacuum-attached) to the installation tool by providing one of the installation tool and insert with a magnet and the other with a magnetic material to be attracted by the magnet. The tool is rotated to allow the spring-loaded male connection features to engage the female connection features if they are not already engaged. The installation tool and insert are further rotated while force is applied to drive the insert into the sandwich panel and to frictionally generate heat to friction weld the insert to the sandwich panel.

Preferably, a blade is provided on the insert to form a hole in the sandwich panel during the rotating step. Also, preferably, the male connection feature includes at least one pin extending from the installation tool and the female connection feature includes at least one hole formed in the insert to receive the pin to transfer torque.

Preferably, the insert is first contacted with the installation tool, and the tool is slowly rotated to align the male and female connection features for engagement. The male connection feature is spring loaded toward the insert so that the male connection feature will automatically pop into the female connection feature when aligned. A sensor is provided to sense the position of a ring which moves with the male connection feature to determine when the male and female connection features are properly engaged.

Preferably, an air channel is provided through a motorized head to the installation tool for cooling the installation tool during friction welding.

Objects, features and advantages of the invention are readily apparent from the following detailed description of the invention taken in connection with the appended claims.

BEST MODE FOR CARRYING OUT THE INVENTION

Referring to FIGS. 1 through 4, a thermoplastic insert 10 is shown in accordance with the present invention. As shown, the thermoplastic insert 10 includes a thermoplastic body 12 with a fastener member 14 secured therein. The thermoplastic body 12 includes a circumferential flange 16 having a tapered surface 18, and first and second apertures 20,22 formed therein. The thermoplastic body 12 is also provided with a circumferential groove 24 for handling, as described below.

Figure 1:
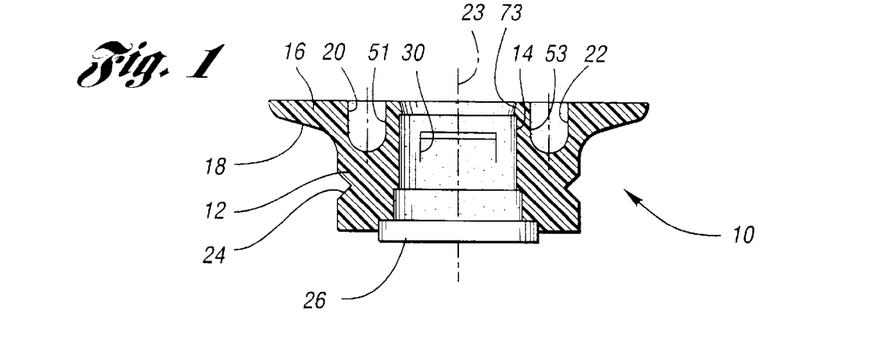
FIG. 1 shows a cross-sectional view of a thermoplastic insert in accordance with the present invention.
Figure 2:
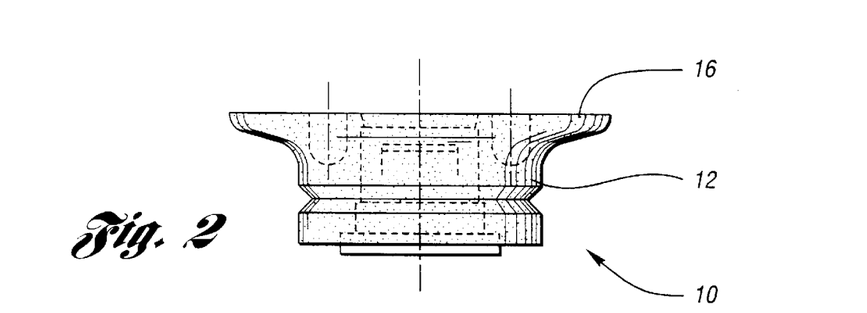
FIG. 2 shows a side view of the thermoplastic insert shown in FIG. 1.
Figure 3:
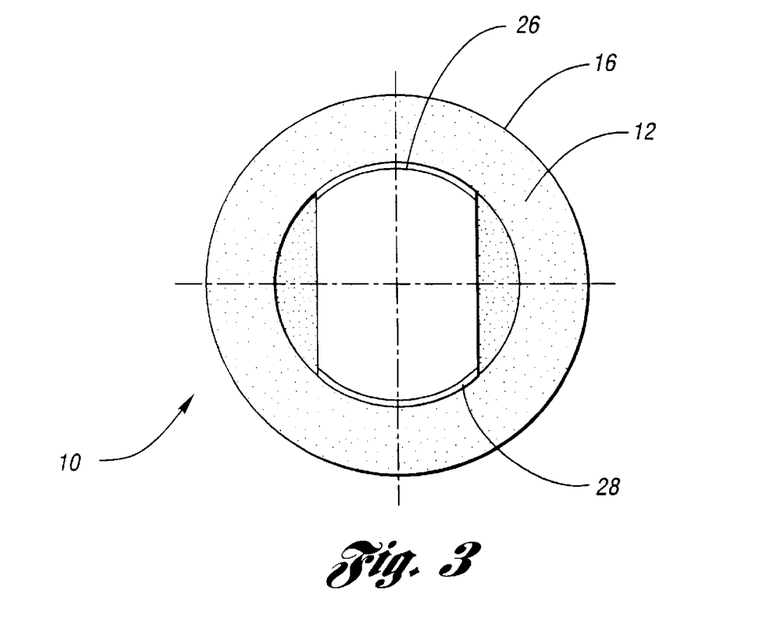
FIG. 3 shows a bottom plan view of the thermoplastic insert shown in FIG. 2.
Figure 4:
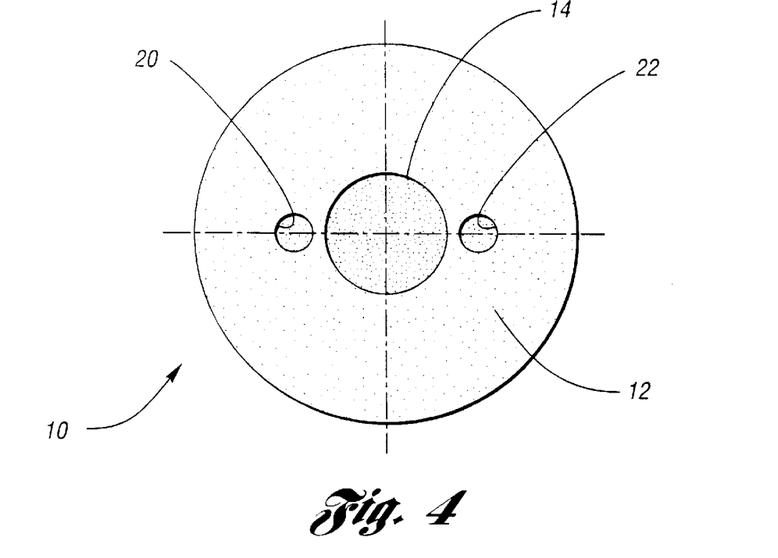
FIG. 4 shows a top plan view of the thermoplastic insert shown in FIG. 2.

The thermoplastic insert 12 is configured for spin welding into a thermoplastic panel. A pair of blades 26,28 is provided on the bottom of the insert 10 to form a hole in the thermoplastic panel as the insert 10 is rotated, as described below. Preferably, the fastener member 14 comprises a magnetic material, such as iron, so that the fastener member 14 may be attracted to a magnet in an installation tool to secure the insert 10 to the installation tool for spin welding insertion. As shown in FIG. 1, the fastener member 14 comprises a metal sleeve 30 adapted to receive a threaded plug. Once the thermoplastic insert 10 has been spin welded into a thermoplastic panel, the sleeve 30 will be exposed for attachment of a bolt or the like in order to attach the thermoplastic panel to an adjacent structure.

Figure 5:
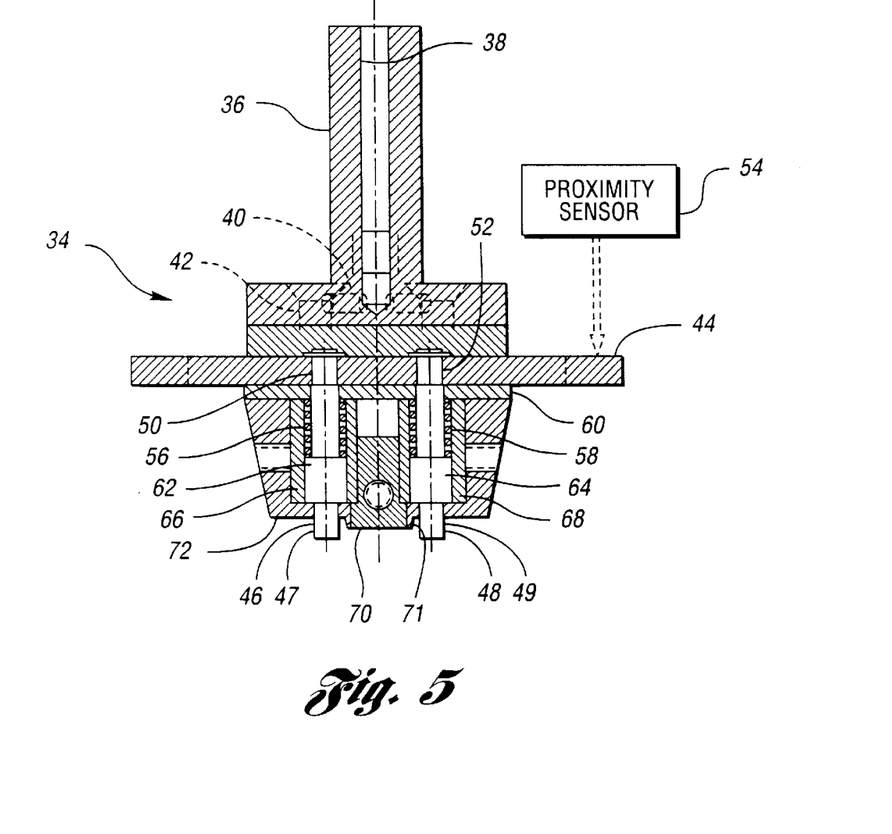
FIG. 5 shows a vertical cross-sectional view of an installation tool in accordance with the present invention.
Figure 6:
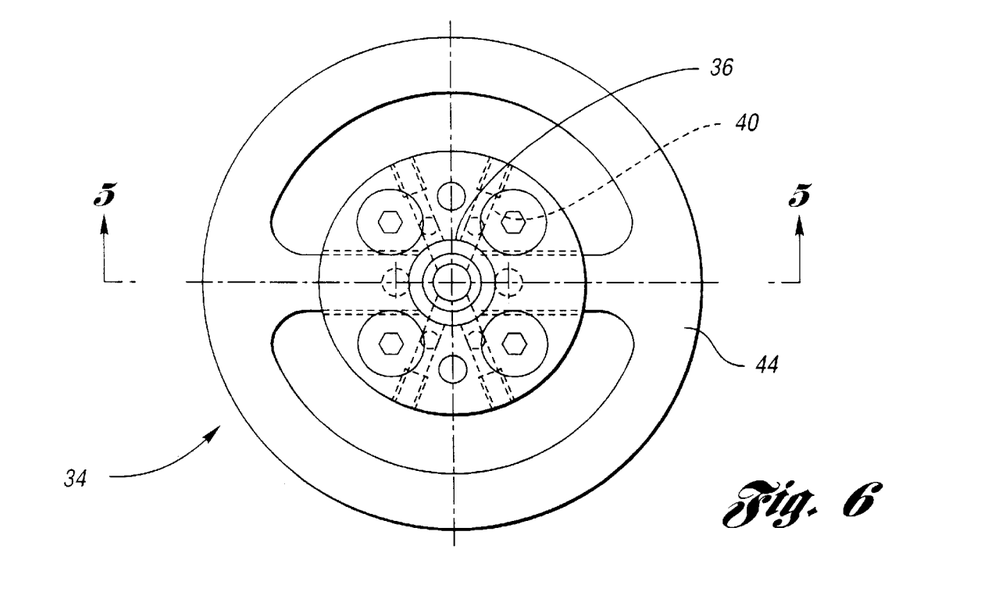
FIG. 6 shows a top plan view of the installation tool of FIG. 5.

Turning to FIGS. 5 and 6, an installation tool 34 is shown for spin welding the thermoplastic insert 10 shown in FIGS. 1–4. As shown, the installation tool 34 comprises a shaft 36 which is attachable to the collet of a motorized installation head, as described below with reference to FIG. 12. The shaft 36 includes an air channel 38 therein for directing cooling air into the installation tool 34 through the various further channels 40,42 for cooling the installation tool during the spin welding operation.

The installation tool 34 includes a motion ring 44 which is connected to vertically movable driving pins 46,48 at the apertures 50,52. Accordingly, the motion ring 44 moves vertically with the driving pins 46,48. A proximity detector 54, shown schematically in FIG. 5, is positioned closely adjacent the motion ring 44 for determining the position of the motion ring 44, thereby determining the position of the driving pins 46,48 for control of the installation tool 34, as described below. When the driving pins 46,48 are engaged within the apertures 20,22 of the insert, shown in FIG. 1, the insert 10 may be rotated by the driving pins 46,48 as the installation tool 34 is rotated. The outer surfaces 47,49 of the pins (shown in FIG. 5) mate with the inner surfaces 51,53 of the apertures 20 and 22 (shown in FIG. 1). These mating outer and inner surfaces are positioned offset from the central axis 23 of the thermoplastic insert shown in FIG. 1, such that torque may be transmitted between the installation tool and the insert by means of contact between such surfaces as the installation tool is rotated.

Compression springs 56,58 are provided for biasing the pins 46,48 and motion ring 44 in a downward direction as viewed in FIG. 5. The springs 56,58 react against the plate 60 and push against the thickened portions 62,64 of the driving pins 46,48 to force the pins 46,48 downward. The thickened portions 62,64 of the pins 46,48 slide within the bushings 66,68. The plate 60 also acts as a guide for the pins 46,48.

The installation tool 34 is provided with at least one magnet 70 in the tip thereof for attraction to the magnetic material of the fastener member 14 of the thermoplastic insert 10 shown in FIGS. 1–4. As mentioned above, the fastener member 14 is preferably a metal sleeve which may be threaded, or may receive a threaded plug.

In operation, the thermoplastic insert 10 will be handled by inserting opposing gripper arms into opposing edges of the circumferential groove 24 in order to pick-and-place the thermoplastic insert 10 into position flush against the installation tool 34. As the thermoplastic insert 10 is moved into position against the bottom surface 72 of the installation tool 34, the thermoplastic insert 10 will push the driving pins 46,48 into the installation tool 34 against the force of the springs 56,58 if the pins 46,48 are not aligned with the apertures 20,22 in the body 12 of the thermoplastic insert 10.

Around the tip of the magnet 70, the tool is tapered at 71 (shown in FIG. 5) to correspond with the tapered surface 73 (shown in FIG. 1) of the insert. This allows the insert and tool to align diametrically at the interface plane therebetween and also prevents the insert from translating horizontally in this plane.

As the insert 10 is moved into position against the bottom surface 72 of the installation tool 34, the springs 56,58 are compressed as the pins 46,48 move upward into the installation tool 34, as viewed in FIG. 5, and the motion ring 44 moves upward with the pins 46,48. When the insert is flush against the installation tool 34, the proximity detector 54 will sense the position of the motion ring 44, and it will be determined that the pins 46,48 are not aligned with the apertures 20,22. In this position, the magnet 70 holds the thermoplastic insert 10 against the bottom surface 72 by its attraction to the fastener member 14.

Figure 7:
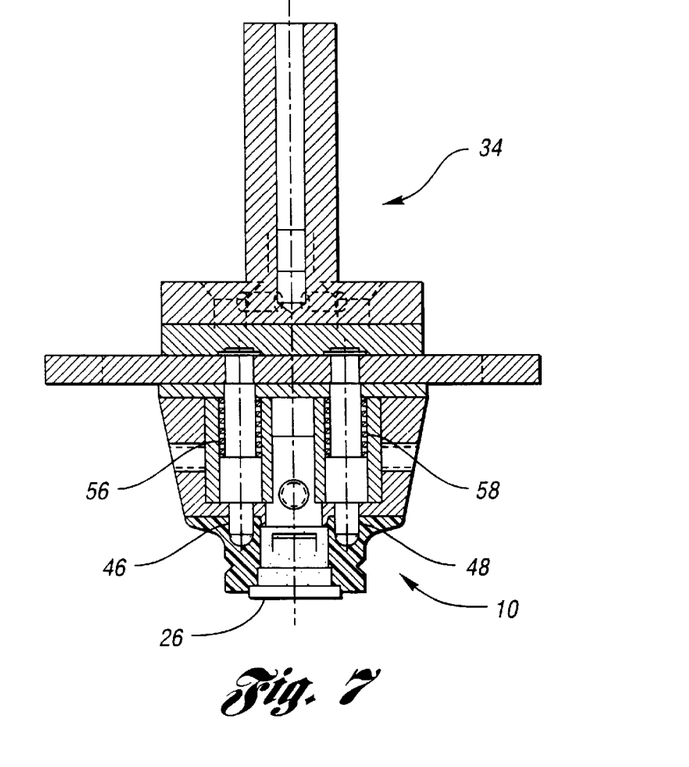
FIG. 7 shows a vertical cross-sectional assembly view of the thermoplastic insert of FIG. 1 engaged with the installation tool of FIG. 5.

The installation tool 34 will then rotate slowly until the driving pins 46,48 are aligned with and enter the apertures 20,22. The force of the compression springs 56,58 will force the pins 46,48 into the apertures 20,22, and the motion ring 44 will move downward with the pins 46,48. The proximity detector 54 will then detect the position of the ring 44 being down, thereby indicating that the pins 46,48 are fully engaged in the apertures 20,22. This position is shown in FIG. 7. In this position, the pins 46,48 are positioned to rotatably drive the thermoplastic insert 10 as the magnet 70 holds the thermoplastic insert 10 against the installation tool 34.

Figure 8:
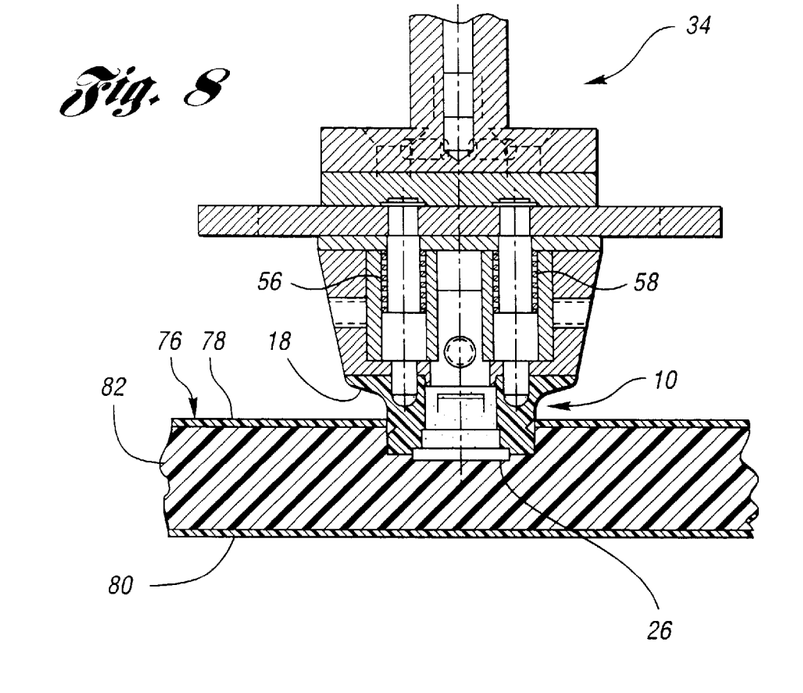
FIG. 8 shows a sectional view of the installation tool and thermoplastic insert of FIG. 7 being drilled into a thermoplastic panel.
Figure 9:
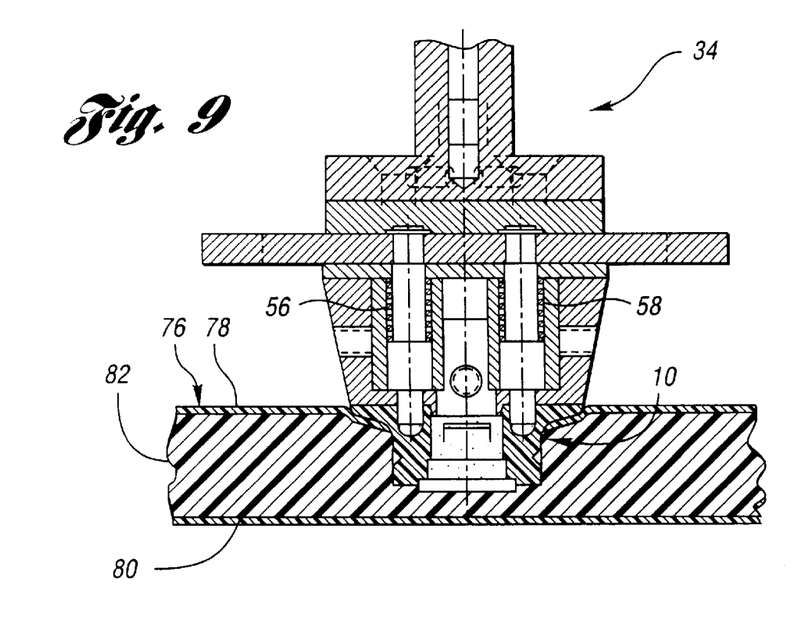
FIG. 9 shows a sectional view of the installation tool and insert of FIG. 8 driven further into the thermoplastic panel.
Figure 10:
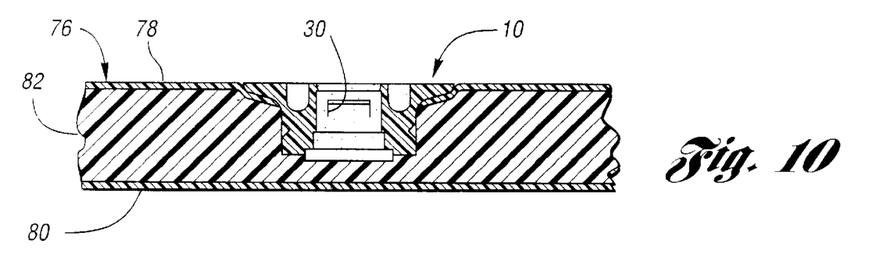
FIG. 10 shows a cross-sectional view of the insert of FIG. 9 embedded into the thermoplastic panel.

Turning to FIGS. 8–10, the thermoplastic insert 10 is shown being sequentially driven into a thermoplastic panel 76 having first and second skin sheets 78,80 with a honeycombed intermediate layer 82 therebetween. As the installation tool 34 is rotated and forced downward against the thermoplastic panel 76, the blades 26,28 form a hole in the thermoplastic panel 76, and the thermoplastic insert 10 is inserted into the formed hole. As the insert 10 is rotatably driven into the thermoplastic panel 76, a significant amount of frictional heat is generated so that the insert 10 is friction welded to the thermoplastic panel 76. The tapered surface 18 of the thermoplastic insert 10 helps to maintain concentricity of the insert 10 as the insert is spin welded into the thermoplastic panel 76, and the tapered surface 18 also causes friction for fusion into the panel 76. As shown in FIG. 10, the thermoplastic insert 10 has been spin welded into position within the thermoplastic panel 76, and the sleeve 30 is exposed on the first skin sheet 78 side of the thermoplastic panel 76. Accordingly, an attachment feature may be inserted into the sleeve 30 to attach the thermoplastic panel 76 to an adjacent structure.

Figure 11:
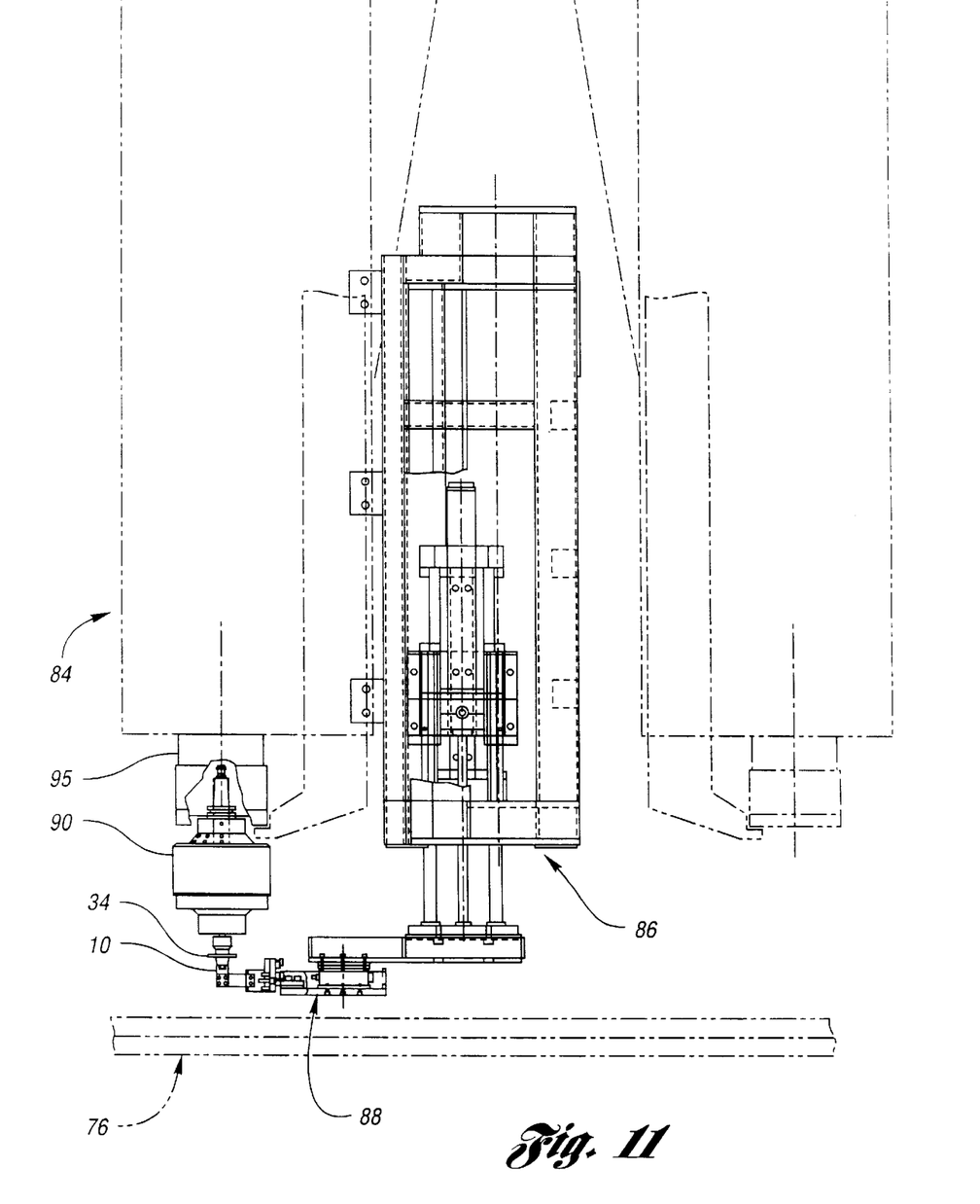
FIG. 11 shows a side view of a spin weld insertion assembly in accordance with the invention.

Referring to FIG. 11, a spin weld insertion assembly 84 is shown for performing the operations described above. In the embodiment shown, a rotatable carousel 86 is provided with a rotatable carousel therein and a movable arm assembly 88 extending therefrom for performing a "pick-and-place" operation to grasp a thermoplastic insert 10 and move the insert 10 into position against the installation tool 34. Preferably, the gripper arms of the movable arm assembly 88 are operative to grip the circumferential groove 24 of the thermoplastic insert 10, shown in FIG. 1. In this configuration, the thermoplastic insert 10 may be held flush against the installation tool 34 as the magnetic attraction occurs between the installation tool 34 and the thermoplastic insert 10, and the pins 46,48 are rotated for alignment with the apertures 20,22 in the thermoplastic insert. Once the driving pins 46,48 have been engaged within the apertures 20,22, the magnet 70 shown in FIG. 5, of the installation tool 34 holds the insert in position to be spin welded into the thermoplastic panel 76. A motorized head 90 is provided for rotating the installation tool 34 to engage the driving pins with the apertures of the thermoplastic insert 10 as described previously, and to spin weld the thermoplastic insert 10 into the thermoplastic panel 76.

Figure 12:
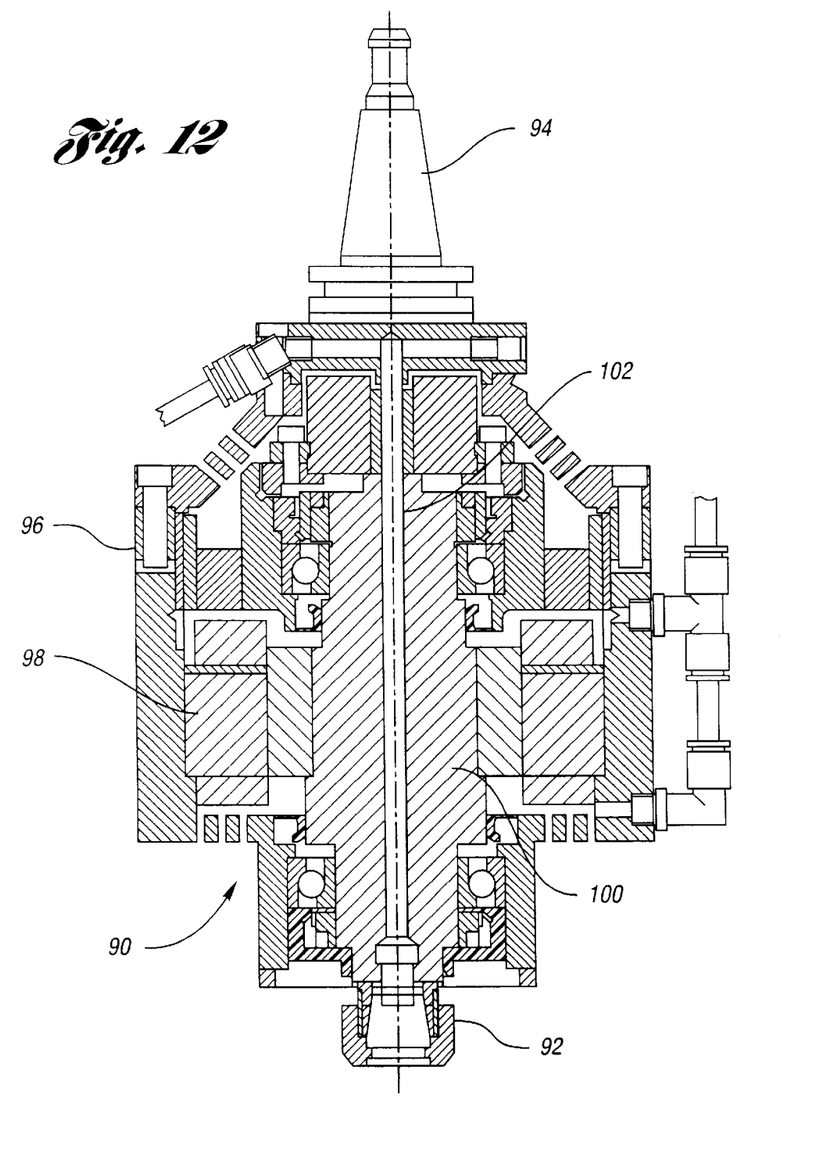
FIG. 12 shows a vertical cross-sectional view of a motorized head shown in the insertion assembly of FIG. 11.

Turning to FIG. 12, the motorized head 90 is shown in greater detail. As shown, the motorized head 90 includes a collet 92 for engaging the shaft 36 of the installation tool 34, shown in FIG. 5. The motorized head 90 also includes a tool holder 94 to be engaged with the support structure 95 of the spin weld insertion assembly, shown in FIG. 11. The motorized head 90 further includes a housing 96 with a motor 98 and spindle 100 disposed therein. An air channel 102 is provided through the center of the motorized head 90 for directing cooling air through the motorized head 90 into the air channel 38 in the installation tool 34, shown in FIG. 5, for cooling the installation tool 34. The gearing-down provided by the motorized head is not necessary if the driving machine operates at the appropriate speed.

While an embodiment of the invention has been illustrated and described, it is not intended that this embodiment illustrate and describe all possible forms of the invention. Rather, the words used in the specification are words of description rather than limitation, and it is understood that various changes may be made without departing from the spirit and scope of the invention.

What is claimed is:

1. A method of securing a thermoplastic insert between first and second skin sheets of a sandwich panel using an installation tool to rotate the insert about a central axis, comprising:

providing one of the installation tool and insert with a male connection feature and the other with a female connection feature such that the installation tool and insert are axially movable toward and away from each other to engage the male and female connection features without requiring relative rotation, wherein said male and female connection features include mating surfaces offset from the central axis to transmit torque between the installation tool and insert;

magnetically attracting the insert to the installation tool by providing one of the installation tool and insert with a magnet and the other with magnetic material to be attracted by the magnet; and simultaneously rotating and applying force to the installation tool and insert to drive the insert into the sandwich panel and to frictionally generate heat to friction weld the insert to the sandwich panel.

2. The method of claim 1, further comprising providing a blade on the insert to form a hole in the sandwich panel during said rotating step.

3. The method of claim 1, wherein said male connection feature comprises at least one pin extending from the installation tool, and said female connection feature comprises at least one aperture formed in the insert to receive the pin.

4. The method of claim 1, further comprising contacting the insert with the installation tool and, prior to said step of simultaneously rotating and applying force, slowly rotating the tool to align the male and female connection features.

5. The method of claim 4, further comprising spring-biasing the male connection feature toward the female connection feature to force the male connection feature into engagement with the female connection feature when said features are aligned.

6. An apparatus for securing a fastener member within a sandwich panel, comprising:

a thermoplastic insert having the fastener member secured therein and a central axis, said insert including a blade for forming a hole in the sandwich panel;

a rotatable installation tool engageable within the insert to rotate the insert about the central axis;

wherein one of said installation tool and insert includes a male connection feature and the other includes a female connection feature such that the installation tool and insert are axially movable toward and away from each other to engage the male and female connection features without requiring relative rotation, wherein said male and female connection features include mating surfaces offset from the central axis to transmit torque between the installation tool and insert; and wherein one of said installation tool and insert includes a magnet and the other includes magnetic material to be attracted by the magnet for securing the insert to the installation tool for friction welding the sandwich panel to the insert.

7. The apparatus of claim 6, wherein said male connection feature comprises at least one pin extending from the installation tool, and said female connection feature comprises at least one aperture formed in the insert to receive the pin.

8. The apparatus of claim 7, further comprising a spring positioned in the installation tool biasing said pin toward the insert.

9. The apparatus of claim 8, further comprising an enlarged ring secured to the pin and movable therewith, and a position sensor operative to sense the position of the ring to determine if said pin is engaged in said aperture.

10. The apparatus of claim 6, wherein the insert comprises a body having a circumferential groove formed on an outer surface in a position perpendicular to the central axis to facilitate handling.

11. An apparatus for securing a threaded sleeve within a sandwich panel for use in an aircraft, comprising:

a thermoplastic insert having the threaded sleeve secured therein and having a central axis;

a rotatable installation tool engageable with the insert to rotate the insert about the central axis;

wherein one of said installation tool and insert includes a male connection feature and the other includes a female connection feature such that the installation tool and insert are axially movable toward and away from each other to engage the male and female connection features without requiring relative rotation, wherein said male and female connection features include mating surfaces offset from the central axis to transmit torque between the installation tool and insert; and wherein one of said installation tool and insert includes a holding means and the other includes engagement means to be attracted by the holding means for securing the insert to the installation tool for friction welding the insert to the sandwich panel.

12. The apparatus of claim 11, wherein said male connection feature comprises two pins extending from the installation tool, and said female connection feature comprises two apertures formed in the insert to receive the pins.

13. The apparatus of claim 12, further comprising at least one spring positioned in the installation tool biasing said pins toward the insert.

14. The apparatus of claim 13, further comprising an enlarged ring secured to the pin and movable therewith, and a position sensor operative to sense the position of the ring to determine if said pins are engaged in said apertures.

15. The apparatus of claim 11, wherein the insert comprises a body having circumferential groove formed on an outer surface in a position perpendicular to the central axis to facilitate handling.

16. The apparatus of claim 11, further comprising a motorized head operative to rotate the installation tool, said head having an air channel formed therein to direct air to the installation tool for cooling the installation tool during friction welding operations.

17. The apparatus of claim 11, wherein the holding means comprises a magnet and the engagement means comprises a magnetic material.

* * * * *